United States Patent [19]

Francart, Jr.

[11] Patent Number: 4,533,113
[45] Date of Patent: Aug. 6, 1985

[54] COMPACT HIGH TORQUE ROTARY VALVE OPERATOR FOR SIMULTANEOUS ACTUATION OF MULTIPLE ROTARY VALVES

[76] Inventor: Armand Francart, Jr., Rte. #2, Landenberg, Pa. 19350

[21] Appl. No.: 603,378

[22] Filed: Apr. 24, 1984

[51] Int. Cl.³ .......................................... F16K 31/163
[52] U.S. Cl. ................................. 251/63.4; 251/248; 251/279; 251/62; 137/595; 92/140; 92/136; 74/105
[58] Field of Search .................... 92/136, 140; 74/104, 74/105, 471 R, 503; 251/228, 231, 233, 248, 279, 62, 63.4, 234, 250.5; 137/865, 869, 862, 864, 887, 595

[56] References Cited

U.S. PATENT DOCUMENTS

| | | | |
|---|---|---|---|
| 979,532 | 12/1910 | Merrill et al. | 137/865 |
| 1,231,305 | 2/1917 | Shepherd | 251/231 X |
| 1,661,691 | 5/1926 | Eason | 251/233 X |
| 2,073,891 | 3/1937 | Vogler | 137/595 |
| 2,467,065 | 4/1949 | White | 137/595 X |
| 2,646,074 | 7/1953 | Hopkins | 251/62 X |
| 3,218,023 | 11/1965 | Kirkup | 137/865 X |
| 3,409,048 | 11/1968 | Brown | 137/867 X |
| 3,444,784 | 5/1969 | Wengerd | 92/140 X |
| 3,646,832 | 3/1972 | Hinofuji | 74/104 X |
| 3,650,506 | 3/1972 | Bruton | 251/63.4 X |
| 4,191,214 | 3/1980 | Holley et al. | 74/104 X |

FOREIGN PATENT DOCUMENTS

| | | | |
|---|---|---|---|
| 384918 | 12/1922 | Fed. Rep. of Germany | 74/104 |
| 146451 | 11/1981 | Japan | 92/140 |
| 183862 | 7/1922 | United Kingdom | 137/595 |

*Primary Examiner*—Larry Jones
*Assistant Examiner*—Carl D. Price
*Attorney, Agent, or Firm*—Sughrue, Mion, Zinn, Macpeak, and Seas

[57] ABSTRACT

A pair of spaced rotatable shafts are mounted within a housing. A linear motor mounted to the housing has a reciprocating piston within a double action piston chamber whose piston rod projects from the piston. Both shafts are fixed directly to axially aligned rotary valve stems, to opposite sides of the reciprocating piston rod. A pin coupled to the end of the piston rod projects through longitudinal slots within radial arms fixed to respective shafts at different levels and rotating with the shafts. Equal sized gears mounted to the shafts are in peripheral mesh such that the shafts rotate in unison. The mechanism eliminates side thrust on the piston and piston rod, doubles the valve breakout forces applied to the rotary valve member and eliminates the need for an outboard bushing for a piston rod extension beyond its connection to the paired shafts.

4 Claims, 7 Drawing Figures

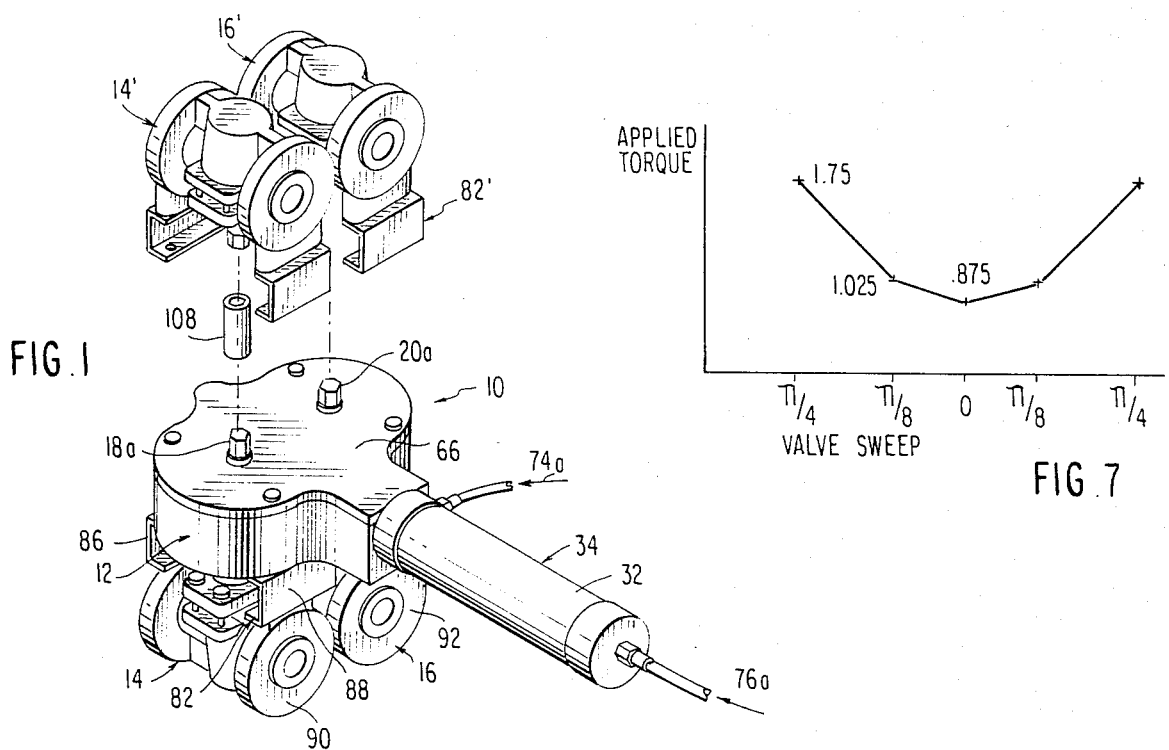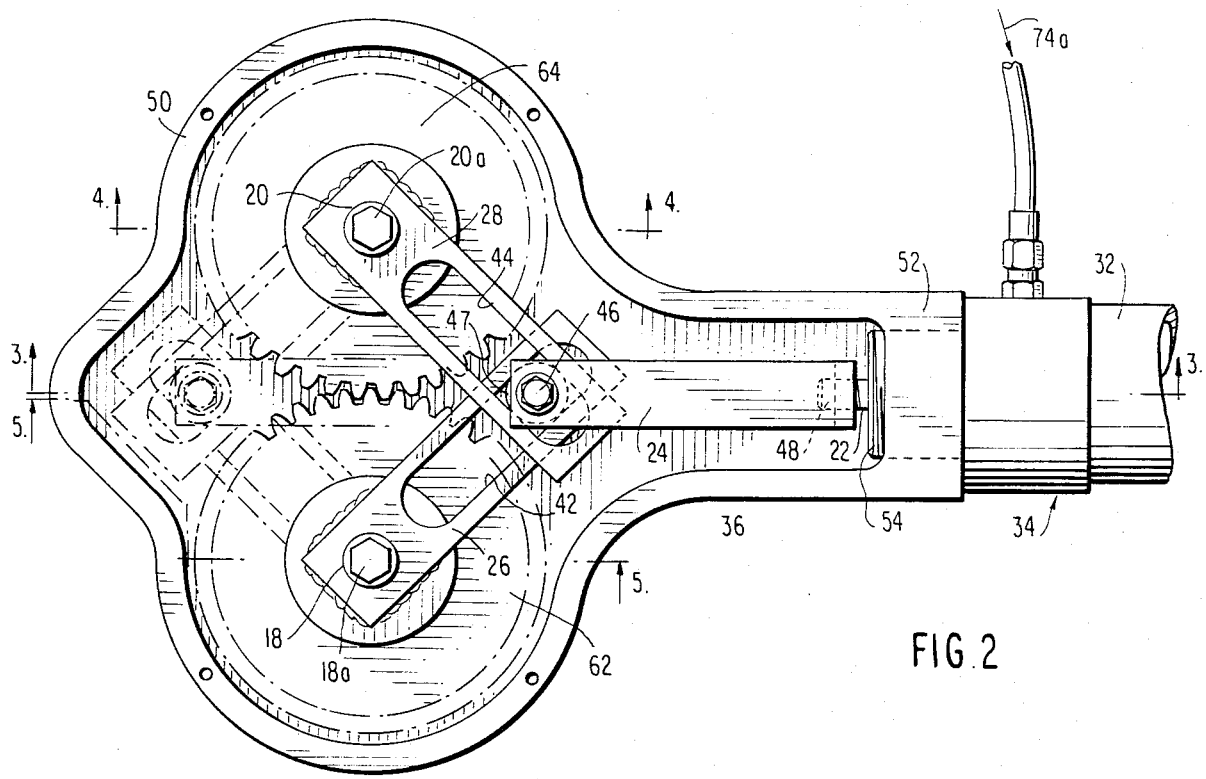

4,533,113

COMPACT HIGH TORQUE ROTARY VALVE OPERATOR FOR SIMULTANEOUS ACTUATION OF MULTIPLE ROTARY VALVES

FIELD OF THE INVENTION

This invention relates to valve operators, and more particularly, to pneumatic or hydraulic powered operators for opening and closing butterfly and other valves having a rotatable flow control element.

Pneumatic or hydraulic power operators for butterfly valves are in universal use. The butterfly valve member is mounted for rotation on an integral rotary valve stem and shifts from a transverse, valve closed position with respect to a cylindrical flow passage within the valve casing or housing, to a right angle, in line position with the flow, i.e. through 90 degrees.

For open/closed operation with high pressure air or hydraulic fluid, typically a double acting air cylinder is bracket or otherwise bolted to a valve body. By use of a Scotch yoke, rack and pinion or lever and link-type mechanism connected to the rotary valve stem the longitudinal motion of the air cylinder piston, via the piston rod, is converted to 90 degree rotary motion of the valve stem and butterfly valve member. Mechanisms of this type impose a heavy bending load on the valve stem and a high side load on the upper portion of the stem, its bearing and on that mechanism including the piston rod for converting the reciprocating motion of the piston to rotary motion of the valve stem.

U.S. Pat. No. 3,650,506 is typical of such rotary valve having a reciprocal fluid actuator operator wherein particularly the high side loading to the reciprocating mechanism including the piston rod requires an extension of the rod beyond its coupling point with the rotary valve stem and the utilization of a bushing at that end to absorb the side bending forces acting on the piston rod itself.

In an attempt to reduce the overall size of the rotary valve operator, and eliminate the transverse load problem for guiding the piston and its piston rod in a straight path, U.S. Pat. No. 3,737,142 incorporates a rotatable lever, which lever includes an arcuate slot, fixedly mounted to the rotary valve stem and acting as a radial extension thereof which is shaped in the configuration of an involute curve whose circle of generation is concentric with the lever's axis of rotation. The connection between the piston rod and the lever takes the form of a cylindrical roller positioned in the artcuate slot of the lever and a cylindrical pin extends coaxially through the roller and the arms of a clevis which straddles the lever so that rectilinear movement of the piston will effect rotation of the lever and the valve stem about the stem's axis. Further, the centerline through the piston and the clevis intersects the common axis to the roller and pin and is tangent to the circle of generation of the involutely curved slot. As such, during piston reciprocation, in the cylinder, the roller applies a force against the side of the slot in a direction that is always normal to it at the point of contact, so that, allegedly, the only lateral or side load that occurs on the clevis and piston is a result of friction as between the roller and the slot and misalignment of the piston, lever, etc.

As may be appreciated, while this tends to reduce the effect of side thrust, it may not eliminate the same.

It is, therefore, a primary object of the present invention to provide a valve operator for operating at least one rotatable valve member via a rotary valve stem of that valve member in which there is an elimination of lateral side thrust acting on the piston rod of a double acting fluid piston within the linear fluid motor cylinder driving the rotary valve stem and other torque transmission members, wherein the effect is to double the valve breaking force applied to the valve member by the fluid motor, and wherein a single valve operator may advantageously be employed for opening and closing up to four juxtapositioned rotary valves of the butterfly or other type.

SUMMARY OF THE INVENTION

The invention is directed to an improved valve operator, wherein a rod is mounted on a housing for axial movement and motor means carried by the housing operatively coupled to the rod effects reciprocation of the rod. At least one rotary valve is mounted to the housing, and said at least one rotary valve includes a rotary valve stem fixedly coupled to a movable valve element to effect movement of the valve element between valve open and valve closed position. Means are provided within the housing for operatively connecting the rod to the valve stem and for changing the reciprocating motion of the rod to rotary movement of the valve stem. The improvement resides in the connecting and motion changing means wherein first and second parallel shafts are mounted within the valve operator housing for rotation about their axes at right angles to the axis of the rod with the shafts positioned equally to each side the rod. Arms are fixed to respective shafts and project radially therefrom at different vertical heights, longitudinal slots are provided within the arms, and pin means fixed to the rod and projecting at right angles to the axis of the rod engage commonly within the slots. Gears are fixed to the shafts and rotatable therewith and are intermeshed with each other, and means connect one of the shafts to the rotary valve stem of the at least one valve element. With the shafts positioned at distances with respect to each other, to equal sides of the axis of the rod and with the arms being of such length as to sweep across the rod during rotation thereof with their ends overlapping, and wherein the lengths of the longitudinal slots and the positions of the same within said arms and the extent of reciprocation of the rod, are such that during rod reciprocation, the valve element is rotated from full open position to full closed position and vice versa. The effect of this is to ensure that the shafts rotate in unison. Forces are evenly distributed from the motor means to the shafts, and there is no side thrust on the rod by reaction torques from the at least one rotary valve. Power losses are minimized, and the breakout forces acting on the valve element are maximized.

The valve operator may have its motor means comprised of a cylinder with the rod comprising a piston rod terminating at one end in a double acting piston with the piston being mounted for reciprocation within the cylinder and with the piston and cylinder forming piston chambers on opposite sides of the piston. Means selectively supply and remove fluid under pressure to the chambers to drive the piston in opposite directions, thus effecting the reciprocating motion of the piston rod and clevis means fixed to the end of the piston rod remote from the piston and bearing the pin commonly positioned within longitudinal slots of the arms causing motion transfer to the arms where they are rotated, achieving the resultant rotation of the rotary valve stem.

The arrangement permits four rotary valves to be mounted as pairs to the top and bottom of the valve operator housing and coupled to the valve operator reciprocating rod via their rotary valve stems by direct connection by and between the first and second parallel shafts.

BRIEF DESCRIPTION OF THE DRAWINGS

FIG. 1 is an exploded, perspective view of a preferred embodiment of the valve operator for operating a rotary valve member as applied to a plurality of cone type rotary valves.

FIG. 2 is a plan view of the valve operator of FIG. 1 with the cover removed and with the cone valves in full closed position.

FIG. 7 is a plot of the breaking torque on a single cone type valve during valve rotation from full open to full closed position.

DESCRIPTION OF THE PREFERRED EMBODIMENT

Figure 3:
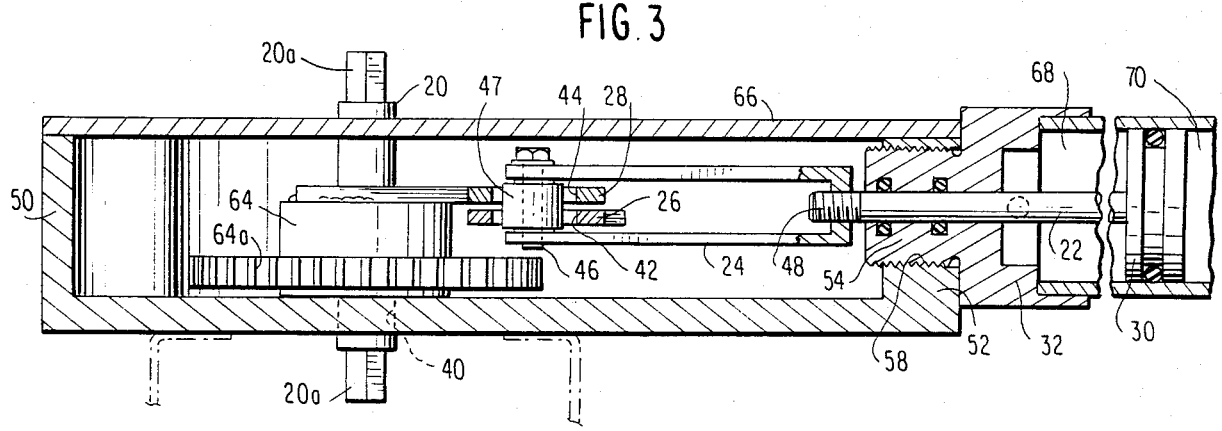
FIG. 3 is a vertical sectional view fo the valve operator of FIG. 2 taken about line 3—3.

Referring to FIGS. 1-6 inclusive, a preferred embodiment of the present invention constitutes a valve operator indicated generally at 10 which comprises a machined, cast or otherwise formed metal valve operator housing 12, permitting the mounting of operator 10 to one bottom pair of cone rotary valves, coupled thereto, FIG. 1, at 14 and 16, respectively. A second, top pair of rotary valves indicated as at 14', 16', may be mounted thereto and jointly driven by a single, common power source. In terms of operator 10, the principal components comprise; a pair of vertically upstanding valve drive shafts 18 and 20 mounted within housing 12 for rotation about their axes, and positioned on opposite sides of piston rod 22, a clevis 24 coupled to the piston rod 22, paired levers or arms 26 and 28 fixed to and projecting radially outwardly of the shafts and being mounted to the piston rod via the clevis, and intermeshed spur gears 62, 64. The piston rod 22 is fixed to and extends from piston 30 which mounts for reciprocation within cylinder 32. The piston and cylinder 32 form the principal components of a linear fluid motor indicated generally at 34.

The housing 12 is provided with a floor 36 having holes 38 and 40 which, in turn, rotatably mount the vertical valve drive shafts 18 and 20. The levers 26, 28 include an elongated straight line slot as at 42, 44, respectively, within which commonly rides a vertical pin 46, surrounded by roller 47, which pin 46, in turn is fixed to the clevis 24. The clevis 24 is threadably mounted to threaded end 48 of piston rod 22. As such, the clevis 24 may be adjusted axially on the piston rod 22 to insure proper and full 90 degree rotation of each of the levers 26, 28. The slots 42 and 44 are of a length sufficient to insure that when the piston reciprocates its full stroke within cylinder 32, shafts 18 and 20 rotate through a full 90 degrees of rotation. The housing 12, in addition to having a floor 36, is provided with an irregular shaped unitary or integral sidewall 50 which terminates in an end wall 52 to which the cylinder 32 attaches. The attachment may be made by way of a reduced diameter cylindrical projection 54 integrally formed with the cylinder end wall 56 and fitted to a hole 58 within the housing end wall 52. The projection 54 forms a bearing through which projects the end of piston rod 22 bearing clevis 24.

It is important to note that there is no connection between the clevis and the housing and no guides for movement of the piston rod beyond projection 54 threaded within the housing end wall 52, such not being needed. This is in contrast to the structure of U.S. Pat. No. 3,737,142 previously referred to.

In the simplified fluid pressure powered operator 10 of the present invention, a key aspect is not only the utilization of paired shafts 18 and 20 which are jointly driven by piston rod 22 through a common engagement via arms or levers 26 and 28, but the positive gear coupling between these shafts to insure rotation in unison, and the distribution of torques by and between the shafts 18, 20 irrespective of the loads thereon.

In that respect, spur gears 62 and 64 are fixedly mounted by welding or otherwise to shafts 18 and 20, respectively. The gears having the same diameter and have gear teeth 62a and 64a on their peripheries in mesh with each other. As such, rotation of the shafts occurs simultaneously to the same degree, and the forces are distributed uniformly to and from the shafts 18, 20, and most particularly, reaction torques from the shafts to the linear motor. A cover 66, which may be identically configured to the housing floor 36, is mounted to the top of housing sidewall 50 and bolted or screwed in place to completely cover the mechanism for actuating one or more of the rotary cone type valves 14, 16 via cylinder 32 (except for projecting ends of shafts 18, 20).

Conventionally, the piston 30 forms with the cylinder 32 a pair of sealed chambers 68 and 70 to opposite sides of the piston, which when selectively pressurized with air or other fluid, causes the piston to move to the full extent permitted by the connection between pin 46 and slots 42, 44 for respective arms or levers 26 and 28. Under the conditions shown, in FIGS. 1-3, reciprocation of the piston from left to right causes the valve to move from full open position shown in FIG. 2 to full closed position, while a reversal of that piston movement from left to right in cylinder 32 will cause the valve to move from full closed to full open position, i.e., cause a cone type valve member 72 for each of the rotary valves 14 and 16 to shift from full open to full closed position. Appropriately, fluid pressure is applied to and removed from respective chambers within the cylinder via respective supply and exhaust ports such as port 74 for the linear motor. Such supply is schematically shown by arrows 74a, 76a. Further, the linear motor 34 and its operation is quite conventional, and such linear fluid motor is a standard commercially available product.

It should be noted that the casing or housing cover 66 is provided with two holes as at 78 and 86 through which projects the upper ends of the shafts 18 and 20, this permitting coupling to the second pair of cone type or other rotary valves 14', 16' in addition to shaft 5, the single valve actuator 10 and the rotary valves are physically integrated. The nature of the make up of the cone type rotary valves 14 and 16, their mounting by way of bracket assembly 82 to the housing 12 for the valve actuator 10 and the interconnections between the shafts 18 and 20 and the cone valve members 72 of respective rotary valves 14, 16 may be readily appreciated.

Fixedly mounted to the bottom of valve operator housing floor 36, by way of mounting screws 84 and depending therefrom are a pair of U-shaped channel bars 86 and 88 which function as the basic elements for mounting the pair of cone type rotary valves 14, 16 to valve operator 10. The valves are comprised of valve housings 90, 92. Mounting screws 94 project through the bottom horizontal portions of the channel bars and are screwed into the valve housings 90 and 92 to fix the valve housings in proper position. What requires to be accomplished is the physical connection between the drive shafts 18 and 20 and the rotatable valve cones 72 internally of respective valve housings 90, 92.

Each valve housing 90, 92, which may be of cast metal construction, includes a flow way or fluid passage 96 and terminates in flanges 98 at respective ends permitting the valve to be bolted or otherwise secured to adjacent ends of a pipeline (not shown). The valve housings 90 and 92 at the flow way 96, mount the valve disc 72 within tapered holes 102 rotating 90 degrees between a full open position, with its bore 101 in line with the axis of the flow way 96 for free flow, or at right angles thereto, thereby completely closing off flow through that passage. This rotation and actuation is achieved by the utilization of a valve stem 100 which extends at the upper and lower ends of valve disc 72. The lower end of each cone 72 is journaled by a portion of its valve housing 90, 92, while each stem 100 projects upwardly from the cone 72 is journaled for rotation within and extends through an upper flange 104 of respective valve housings 90, 92.

Appropriate sealing rings may be provided as at 106 for fluid isolation of the fluid passing through the valve via flow way 96. The upper free end of each stem 100 projects outwardly of the valve housing and thus is in position for rotary driving connection with the valve operator 10 to which the rotary valves 14 and 16 are mounted via bracket assembly 82.

For illustrative purposes, the upper end 100a of the valve stems 100, in each instance, are provided with a series of multiple flats in a hexagonal array about the periphery to give it a hexagonal cross-sectional configuration, as is the lower end or bottom of the projecting lower ends 18a, 20a of respective drive shafts 18 and 20. Appropriately, a pair of connectors or sockets at 108, 112 are provided, which have hexagonal recesses within opposed ends sized to and fitting the hexagonal male coupling ends 100a of valve stems 100 for valves 14, 16 and ends 18a, 20a of drive shafts 18 and 20, respectively.

As may be appreciated, rather than having male and female interfitting hexagonal projections and sockets for the drive connection between the valve stems of the cone type rotary valves and the drive shafts of of the valve operator 10, a tubular connector may be employed with transverse pins projecting through drilled holes within the projecting ends of the valve operator drive shafts 18 and 20 and valve stems 100 and 110 for connecting the rotary valves 14 and 16, respectively, to the drive shafts.

The visual showings in the various figures and the description have purposely been limited to the basic structural components necessary to adequately describe the invention. Various seals, bearings, bushings and the like, and the fluid connections to the air cylinder linear motor to effect the positive drive of the rotary valve disc between open and closed positions and vice versa are shown in rudimentary form.

While the valve operator is illustrated in conjunction with the lower pair of rotary valves 14 and 16 coupled to their respective drive shafts 18 and 20 to the same side of the rotating arms or levers 26, 28, as having utility for simultaneously driving a pair of rotary valves, it is apparent that by way of second bracket assembly 82', identical to bracket assembly 82, the second pair of rotary valves 14', 16' are mounted on the top of housing 12 in inverted fashion and coupled to the projecting upper ends 18a, 20a of drive shafts 18 and 20 via individual socket type connectors 108' similar to connectors 108.

Additionally, it should be understood that the mechanical coupling and drive system of the present invention permits the equalization of the torques applied through the dual drive shafts to paired lower rotary valves and/or paired upper rotary valves, as the case may be. Flow reaction torques, whether they are equal or different, have no effect on operation of the mechanism. The loads remain balanced, and there is no adverse bending or side loading to the piston rod or to the piston reciprocating within the pneumatic cylinder 32. The result is the same, irrespective of whether the reaction torque, i.e. the loads dependent upon the flows through the rotary valves are equal. The meshing of the gears 62, 64 maintains synchronism of movement and insures equal load distribution throughout the drive mechanism.

Figure 4:
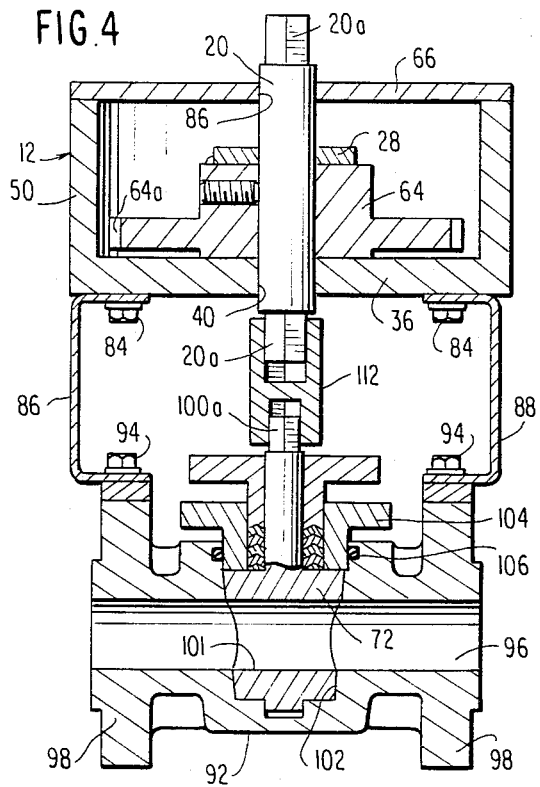
FIG. 4 is a vertical sectional view of the valve operator of FIG. 2 taken about line 4—4.
Figure 5:
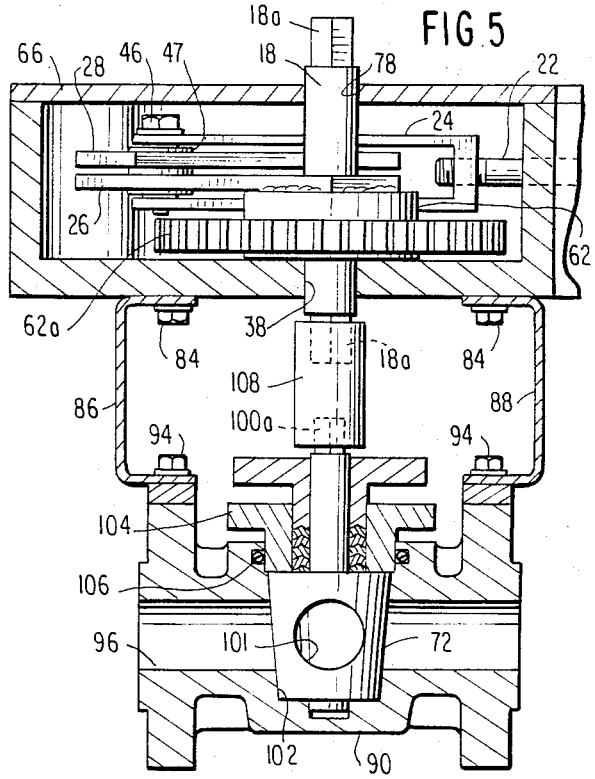
FIG. 5 is a vertical sectional view of the valve actuator of FIG. 2 taken about line 5—5.
Figure 6:
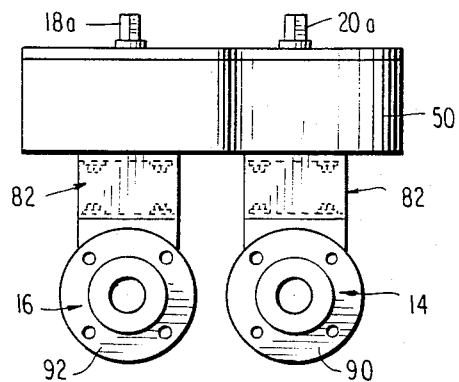
FIG. 6 is an end elevational view of the valve operator and lower pair of cone type rotary valves.

It should also be appreciated that the apparatus has utility where the valve operator functions to drive a single rotary valve, such as rotary valve 16 illustrated in the vertical sectional view of FIG. 4.

Test results show that the employment of dual rotary shafts, intermeshed gears and paired levers or arms, pin and slot connected to the piston rods commonly via the same pin, has multiple advantages.

First, the maximum breakout torque starts with the piston at the end of its stroke, the breaking torque decreasing to a minimum at the point where the arms or levers pass through a centerline between the shaft pivot axis and ending with torque applied to the valves with the piston at the opposite end of its stroke.

Secondly, under a given set of conditions where two rotary valves are employed, as at 14, 16 in the illustrated embodiment, the breakout torque applied to each valve as, for instance, in opening the valve discs against flow, are equal for both valves. They may be, for instance, may be on the order 860 inch pounds each, in a typical arrangement using conventional rotary valves of the type shown with cylinder pressure of 100 psig, see the chart below.

| Pressure (PSIG) | Inch Lbs. Torque/Each Shaft | | Inch Lbs. Torque (Using One Shaft) Total | |
|---|---|---|---|---|
| | Break | Running | Break | Running |
| 10 | 85.9 | 42.95 | 171.8 | 856.9 |
| 20 | 171.8 | 85.9 | 343.6 | 171.8 |
| 30 | 257.7 | 128.85 | 515.4 | 257.7 |
| 40 | 343.6 | 171.8 | 687.2 | 343.6 |
| 50 | 429.5 | 214.75 | 859.0 | 429.5 |
| 60 | 515.4 | 257.7 | 1030.8 | 515.4 |
| 70 | 601.3 | 300.65 | 1202.6 | 601.3 |
| 80 | 687.2 | 343.6 | 1374.4 | 687.2 |
| 90 | 773.1 | 386.5 | 1546.2 | 773.0 |
| 100 | 859.0 | 429.5 | 1718.0 | 859.0 |

It has been ascertained that if one of the valves under such conditions is eliminated and only a single one of the shafts 18 or 20 is coupled a single rotary valve as at 16, for instance, the breakout torque will be doubled on that valve, i.e. raised from 860 inch pounds to about 1700 inch pounds. The system operates under conditions in which the two rotating levers or arms define a square formed of four individual triangles which are at their maximum when the levers are rotated 45 degrees from their in line positions, and to positions of maximum breakout torque. Further, the force application through the triangular arrangement supplies even reaction torque pressures to the ram or pneumatic linear motor 32. This is in contrast to the known prior art devices, such as those discussed, which either use some type of a housing to help eliminate side pressure to the ram, or require bushings at a projected end of the piston rod beyond the force transfer point to the rotating valve stems of the rotary valves. Reference to FIG. 7 shows the variation of torque applied to the rotary valve or valves by the linear motor 34 of the valve operator 10 of the present invention as the rotary valve element 72 rotates from full closed to full open position. While the argument is made that U.S. Pat. No. 3,737,142 teaches an arrangement which "eliminates" side pressures on the pneumatic cylinder or ram, it is difficult to see how this is accomplished in view of the asymmetrical nature of the drive system.

Further, where there is a rack and pinion type connection, the rack is housed within a casing bore, and while its movement is restrained to eliminate side pressure deflection, such arrangements produce considerable friction between the moving parts and, of course, require a larger power source since much of the energy is wasted. Typically, the other valve operators are unbalanced and, as such, are incapable of delivering equal pressure to multiple rotary valves if such multiple rotary valves are coupled in some manner to the single power source.

The valve operator of the present invention is both economical in manufacture, is adaptable to cover a wide variety of conditions including driving one, two, three or four valves. The valve operator is capable of driving valves whose individual load conditions vary, and wherein some of the valves may be moving to open position while others are being closed without affecting power application thereto from the single power source, its uniformity and distribution, all without attendant side forces on the reciprocating piston and its piston rod forming the moving components of the ram or pneumatic linear motor.

While the valve operator utilizes a pneumatic linear motor or ram, it may be appreciated that equivalent means for providing a linear reciprocating motion to the paired levers 26, 28 such as linear electric motor, hydraulic cylinder, and the like may be readily substituted therefor.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A valve operator for operating at least one rotary valve, said valve operator comprising:
   a valve operator housing including a housing wall,
   a rod means capable of movement in the direction of its axis,
   motor means mounted on said valve operator housing and operatively coupled to said rod means for axially reciprocating said rod means,
   said at least one rotary valve having a valve housing for mounting to said valve operator housing,
   said at least one rotary valve including a rotary valve stem mounted within said valve housing and being fixedly coupled to a rotatable valve element for rotation of said valve element between valve open and valve closed positions, and
   wherein said valve operator further comprises means within said valve operator housing for operatively connecting said rod means to said valve stem and for changing the reciprocating motion of said rod means to rotary movement of said valve stem,
   the improvement wherein said connecting and motion changing means comprises:
   first and second parallel shafts mounted within said valve operator housing wall for rotation about their axes at right angles to the axes of said rod means and positioned respectively to opposite sides of said rod means,
   said first and second parallel shafts each include at least one means for connecting one of said shafts to said rotary valve stem of said at least one valve element,
   arms fixed to respective shafts and projecting radially therefrom at different vertical heights, said arms having first and second ends wherein the first end of each arm is fixed to a respective shaft
   longitudinal slots within said arms,
   pin means fixed to said rod means and projecting right angles to the axis of said rod means and engaged commonly within said slots,
   a pair of equal diameter gears coaxially fixed respectively to said shafts at a common level, rotatable therewith, and being intermeshed with each other,
   and wherein each of said shafts is positioned an equal distance from the axis of said rod means and in opposite sides of the axis of said rod means, said arms are of such length as to sweep across said rod means during rotation thereof such that said second ends of said arms overlap, wherein the length of said longitudinal slots and the positions of the same within said arms and wherein the extent of reciprocation of said rod means is such that during rod means reciprocation, said valve element is rotated from full open position to full closed position and vice versa;
   whereby, said shafts rotate in unison, forces are evenly distributed from the motor means to said shafts, there is no side thrust acting on said rod by reaction torque from said at least one rotary valve, power losses are minimized, and breakout forces acting on the valve element are maximized.

2. The valve operator as claimed in claim 1, wherein said motor means comprises a cylinder, said rod means comprises a piston rod terminating at one end in a double acting piston, said motor means further comprises means mounting said piston for reciprocation within said cylinder, said piston and said cylinder form piston chambers on opposite sides of said piston, means for selectively supplying and removing fluid under pressure to said chambers for driving said piston in opposite directions, and clevis means fixed to the end of said piston rod remote from said piston and bearing said pin commonly positioned within said longitudinal slots within said arms.

3. The valve operator as claimed in claim 2, wherein said clevis means is threaded to said piston rod, permitting axial adjustment on said piston rod to correlate the extent of rotation of said arms and of said shafts to the extent of reciprocation of the piston rod.

4. In combination, a rotary type valve comprising a valve housing defining a flow passage therethrough, a rotatable valve element mounted within said housing flow passage for rotation between a first valve open position and a second valve closed position, a rotatable stem fixed to said valve element and extending through said housing, a valve operator comprising a valve operator housing, means for mounting said valve operator housing to said rotary type valve housing, a linear fluid motor inluding cylinder means mounted to said valve operator housing and forming a double acting piston chamber, a piston, means for mounting said piston for reciprocation axially within said cylinder chamber, piston rod means extending axially of said piston and projecting into said valve operator housing and exterior of said cylinder, first and second parallel shafts mounted within said valve operator housing for rotation about their axes at right angles to the axis of the piston rod means and positioned to respective sides of said piston rod means, said first and second parallel shafts to each include at least one means for operatively connecting one of said shafts to said rotatable stem on said rotatable valve element, arms having first and second ends wherein the first end of each arm is fixed to a respective shaft, said arms project radially outwardly thereof, at different vertical heights and rotatable such that when aligned the second ends overlap across said piston rod means, longitudinal slots within said arms, and means including a pin projecting commonly through said longiutudinal slots for coupling said arms to said piston rod means, and equal diameter circular gears coaxially fixed to respective shafts for rotation about the shaft axes and being intermeshed with each other to synchronize shaft rotation and for equalization of load distribution between the shafts, and wherein said arms are of a given length, said longitudinal slots are formed in said arms at given positions and of a given length, and said shafts are positioned relative to each other such that during reciprocation of said piston, said shafts are rotated 90 degrees and said rotary valve member is rotated between full open and full closed position or vice versa during angular rotation of said arms through 90 degrees.

* * * * *